United States Patent [19]
Astheimer et al.

[11] 3,889,970
[45] June 17, 1975

[54] VEHICLE BODY WITH OCCUPANT HEAD-PROTECTIVE CURTAIN

[75] Inventors: Karl Astheimer, Bischofsheim; Karl Hug, Niedernhausen, both of Germany

[73] Assignee: General Motors Corporation, Detroit, Mich.

[22] Filed: Feb. 25, 1974

[21] Appl. No.: 445,135

[30] Foreign Application Priority Data
Mar. 7, 1973   Germany............................ 2311160

[52] U.S. Cl............................................. 280/150 B
[51] Int. Cl. ............................................. B60r 21/02
[58] Field of Search ............... 280/150 B; 296/84 K; 160/166, DIG. 2, DIG. 3

[56] References Cited
UNITED STATES PATENTS
3,037,809   6/1962   Praha................................ 296/84 K
3,525,535   8/1970   Kobori............................ 280/150 B FOREIGN PATENTS OR APPLICATIONS
6,408,047   1/1966   Netherlands.................... 160/166 R Primary Examiner—Robert R. Song
Attorney, Agent, or Firm—James A. Kushman

[57] ABSTRACT

A protective device for the side or rear of a vehicle occupant's head comprises flexible parallel straps secured under tension at their ends to fixed members which are parts of the body or of a seat back, the straps normally having their faces approximately at right angles to the general plane of the curtain formed by the straps, which are thus normally edge-on to the occupant's head. Such an arrangement may be placed at the back or at the side of the occupant's head. When a limiting condition of vehicle deceleration or acceleration is exceeded, the straps are twisted through 90° by loading, or in dependence upon a sensor, so that they form a curtain-like reception surface for the head. The arrangement of parallel straps resembles a Venetian blind which is normally open, but which is closed under the limiting condition referred to.

3 Claims, 23 Drawing Figures

PATENTED JUN 17 1975 3,889,970

SHEET 1

PATENTED JUN 17 1975　　3,889,970

SHEET　3

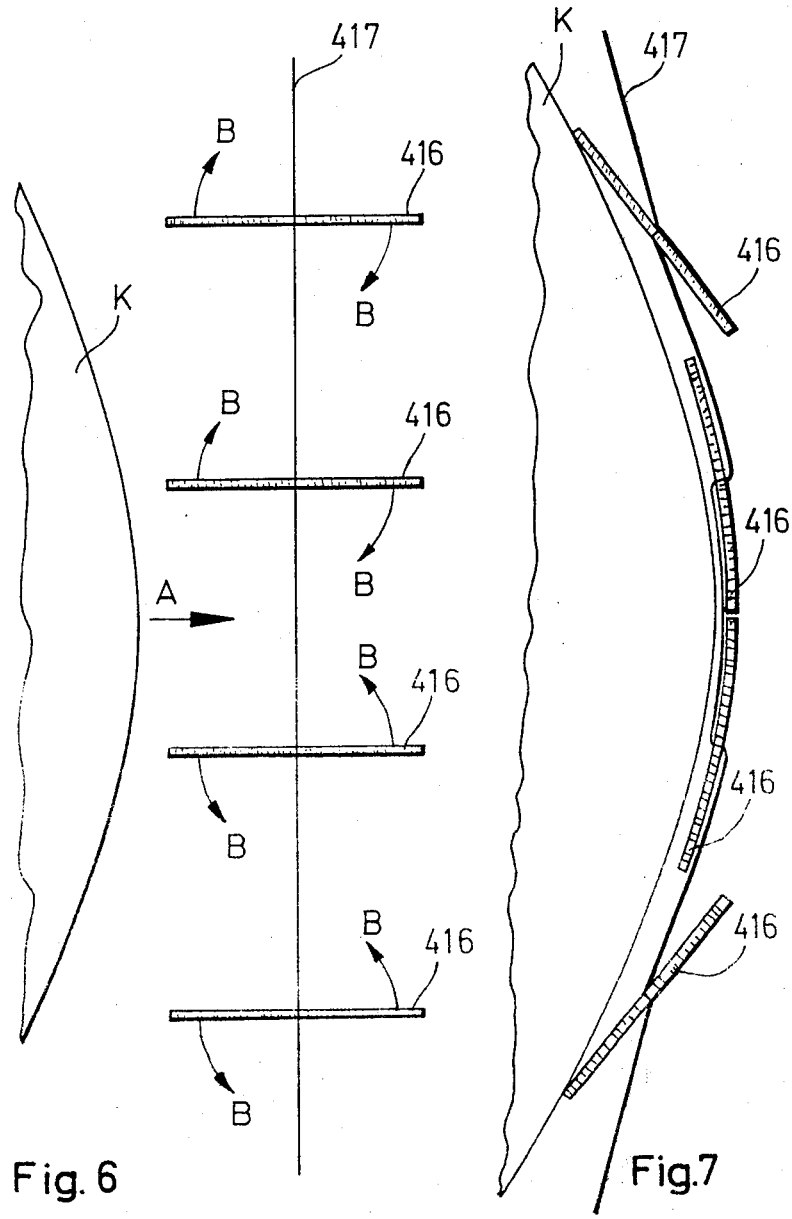

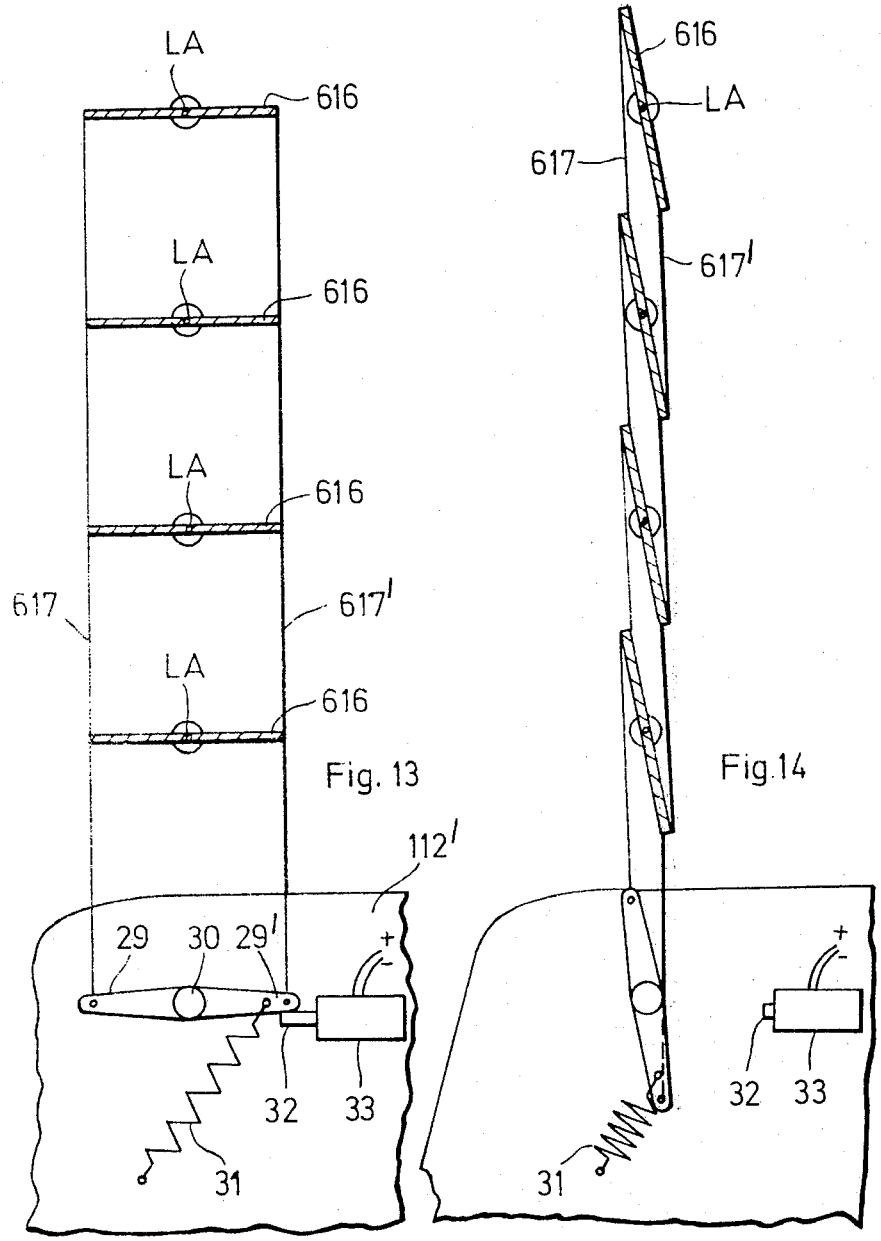

VEHICLE BODY WITH OCCUPANT HEAD-PROTECTIVE CURTAIN

The invention relates to devices for vehicles bodies, particularly passenger cars, for protecting the occupants in the event of accidents. For some time it has been usual, and in fact already required by regulations in some countries, to use head restraints which can be mounted on the back-rests. Also known are seat back-rests with head restraints fashioned on them.

It has been proposed to adopt head restraints which either consist of a frame draped with net (W. German utility model No. 7 204 883 and utility model No. 7 201 173) or are formed of nets freely stretched across between the back-rests and the bodywork roof (W. German utility model No. 7 026 365). It is true that these head restraints do permit a certain through-view; nevertheless due to the netting with relatively thin threads, they involve high specific surface pressure of the head against the net.

It has also been proposed to employ a sheet of transparent plastics material stretched between the rearward roof spar, the upper edge of the back-rest and the rearward roof pillar (W. German patent specification DOS 2 056 801). Again, such an arrangement is unable to do justice to the safety requirements posed, because a certain relation exists between transparency and the plastic deformability of a sheet or foil of plastics material. Such a sheet permitting good transparency must be relatively thin-walled. However, this is in conflict with the absorption of shape-changing work in the event of acceleration, because as is well known, sheets of plastics foil are of reduced durability.

The present invention is concerned with creating for the vehicle occupants, particularly in passenger cars, a protection device which on the one hand will ensure an unimpeded view to all vehicle occupants under normal riding conditions, but on the other hand will offer maximum security in the event of suddenly initiated extreme deceleration or acceleration of the vehicle, whilst at the same time converting kinetic energy by plastic deformation.

According to the invention, this problem is solved by arranging that a head-protective curtain comprising flexible tensioned parallel straps having their faces approximately at right angles to the curtain is provided behind and/or lateral of the vehicle occupants in the free space between the seat back-rests and bodywork parts, after the manner of a Venetian blind, in normal driving conditions the 'blind' being open, and, when a limiting value of vehicle deceleration or acceleration is exceeded, the 'blind' being automatically closed either by loading on the straps, or controllably in dependence upon a limiting value, so that the straps form a closed reception surface for the head.

A protection device consisting of an elastic weave or netting has already been proposed particularly for passenger cars (W. German utility model No. 1 826 509). In normal travelling conditions, the belt netting is in the contracted state, but when the vehicle suddenly changes speed and after automatic release, it drops in front of the seats in the region of the windscreen, at least up to the passenger's shoulder height. The above device fulfils a purpose totally different from that of the present invention where the head of the occupant is to be protected during movements away from the direction of travel.

The invention is illustrated in the accompanying drawings with reference to embodiments by way of example which are described in detail below.

In the drawings:

FIGS. 6, 7 are schematic presentations of the strap arrangement in section along line VI — VI in FIG. 1a in the normal position of the straps (FIG. 6) and in the swivelled position (FIG. 7);

FIG. 13, is a schematic presentation of a strap arrangement in normal position in longitudinal section, in which the position of the straps can be changed by a mechanical device;

FIG. 14, shows the arrangement as in FIG. 13 with the straps in the swivelled position;

In the drawings and in the following description, identical or corresponding parts are provided with the same reference numerals or with numerals increased by one hundred each time, as the case may be.

Figures 1A, 1B:
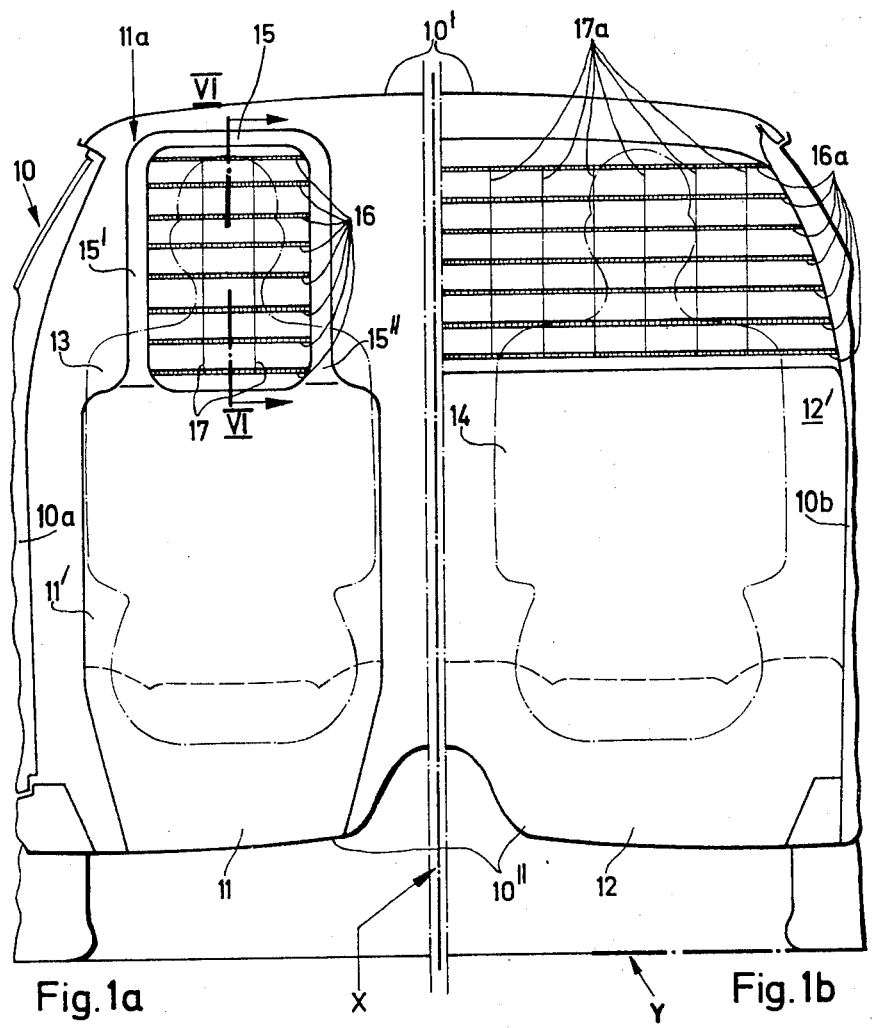
FIG. 1a is a schematic presentation of the left-hand half of a passenger car in cross-section and seen in the direction of travel, with a view of the forward vehicle seat, to the back-rest of which a strap arrangement designed as a head restraint is fitted.
FIG. 1b is a schematic presentation of the right-hand half of the passenger car in cross-section and seen in the direction of travel, with a rear view of the back seat and of a strap arrangement extending across its back-rest over the entire width of the vehicle.

FIGS. 1a, 1b, 2a, 2b, each give an angular section through the transverse plane of the passenger compartment of a motor vehicle body, of which outline is designated by the general reference numeral 10 whilst 10' schematically indicates the vehicle roof, 10a and 10b the side panels and 10'' the vehicle floor on which is the left-hand front seat 11 (FIG. 1a) and the right-hand half of the rear compartment seat (FIG. 1b), seen in the direction of travel. Outlined in dot-dash lines, a vehicle occupant indicated on each of the seats is designated by the reference numerals 13, 14 respectively. The back-rest 11' of the front seat 11 is designed as a head restraint 11a or head-protective curtain in its upper region. The latter consists of a frame 15 which can either be attached to the back-rest, or can be formed from extensions of the lateral spars of the back-rest (which are not shown). Straps 16 running approximately horizontally, are stretched between the frame parts 15' and 15'' running approximately at right angles to the wheel base plane Y (FIG. 1b). The transverse axes of these straps extend approximately at right angles to the plane of the drawing; in other words the faces formed by their transverse and longitudinal axes, are directed approximately at right angles to the longitudinal axes X of the vehicle. The straps consist of a synthetic fibre fabric, capable of performing shape-changing work when under load, such as is already used for seat belts. The parallel distance between the straps 16 is ensured by threads 17 running at right angles to the longitudinal axes of the straps and tied to these latter in each case. The mounting of the straps in the frames 15 may be brought about in various ways. It must however be of such a form that, they are easily able to turn throught about 90°. At the same time, the straps 16 are held in such a way during normal travelling conditions, that their loading faces lie approximately horizontal and at right angles to the longitudinal plane X of the vehicle (FIGS. 1a, 1b, 3, 4 (right hand side), 6, 8, 10, 11, 12, 13, 15, 16, 18, 20), that is edge-on to the occupant's head, whereas under contact of the occupant causing the straps to pivot by approximately 90° about their longitudinal axes, they present a substantially closed resistance area (FIGS. 7, 9, 14) approximately parallel with the transverse plane of the vehicle. In FIG. 1b the straps 16a are stretched at head level above the rear compartment seat back-rests, in the free space between the body side panels, the roof and the upper side of back-rest 12' and are secured in the lateral support parts of the bodywork construction, by way of strap mountings for example; see FIGS. 10, 11, 12, 15. Spacing threads 17a serve, as in FIG. 1a, for maintaining the parallel distance between the straps.

Figures 2A, 2B:
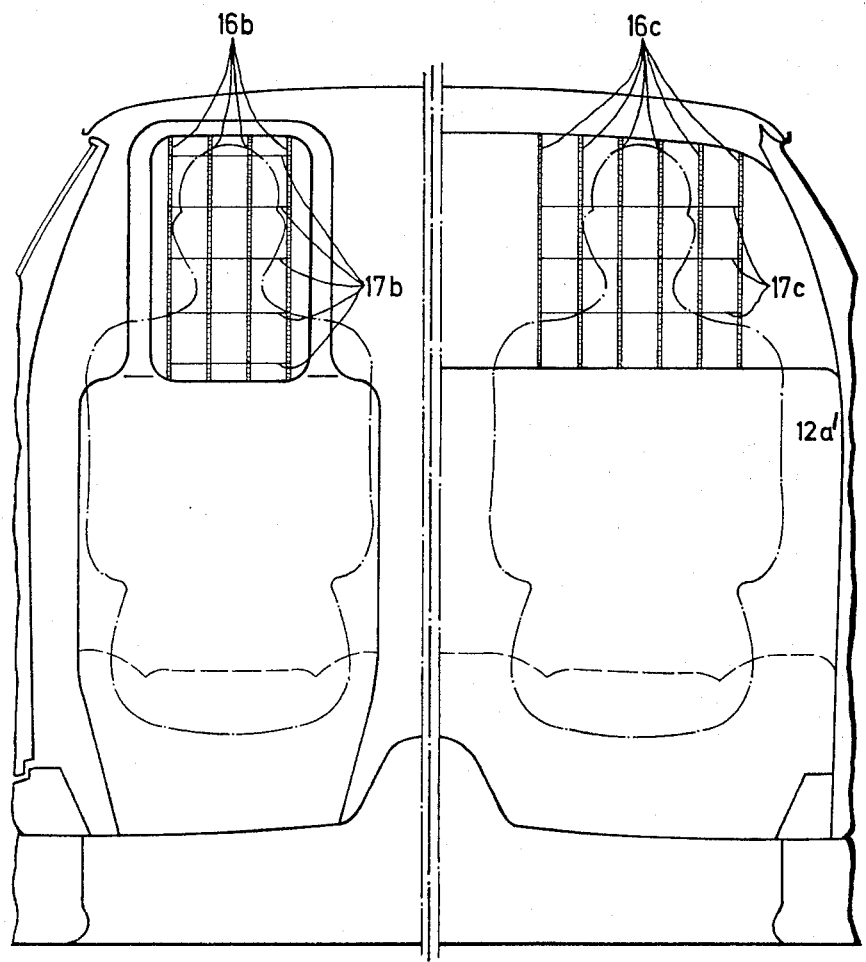
FIG. 2a, 2b are schematic presentations similar to those in accordance with FIGS. 1a or 1b with a different formation of the strap arrangement.

FIGS. 2a and 2b schematically show strap arrangements which are equivalent to those indicated in FIGS. 1a, 1b except that the straps 16b or 16c are turned through 90° and that they are each connected, distanced by spacing threads 17b, 17c whilst in the rear compartment (FIG. 2b) they are held between roof spars and back-rest 12a', extended across a part of the back-rest only. For the rest however, the schematic presentation of the vehicle corresponds to that of FIGS. 1a, 1b.

Under normal travelling conditions, the strap arrangements, placed behind the heads of the occupants will not impede the driver's vision on the road behind as seen in the rear-view mirror. This will be apparent from the presentation according to FIG. 3 which is concerned with a schematic side elevation of the vehicle lay-out according to FIGS. 1a, 1b. Here it is definitely of advantage, and of no detriment to their function, if individual straps are anchored in their lateral mountings with a slight inclination of their transverse axes with respect to the wheel base plane Y (FIG. 1b) of the vehicle, this inclination corresponding to the path of the rays from the rearward road picture reflected in the mirror.

Figure 5:
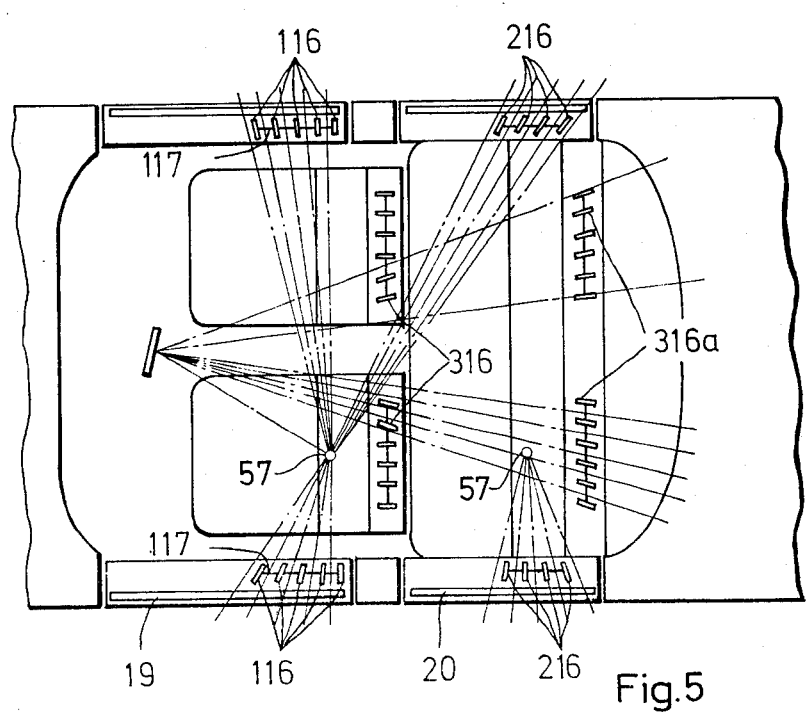
FIG. 5 is a schematic plan of the partially illustrated vehicle according to FIG. 4 with a view from above into the passenger compartment.
Figure 4:
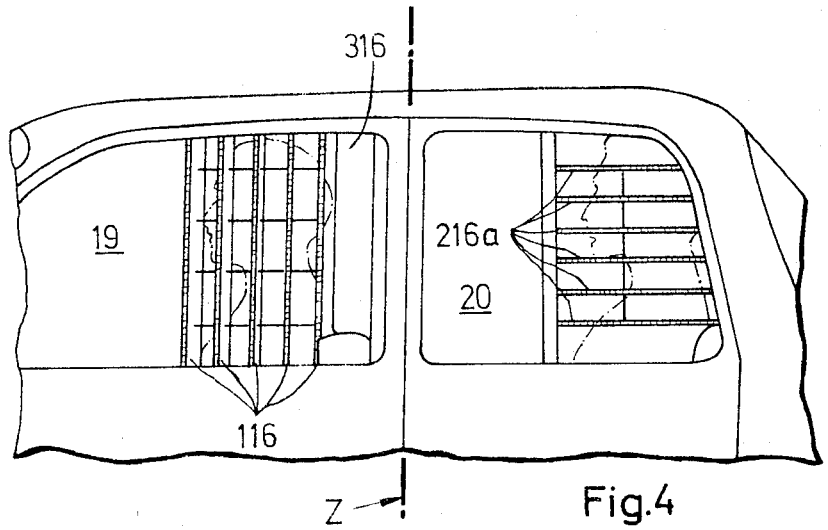
FIG. 4 is a schematic partial presentation of a further passenger car in side elevation.

In FIGS. 4 and 5, additional strap arrangements are located in front of the side windows at the head-level of the occupants. Reference numeral 19 designates the forward left-hand side window, and 20 the rear left-hand side window. Here, in each case the straps 116 in a vertical arrangement are provided with spacing cords 117 and are supported between upper and lower frames, at slight inclination of their transverse axes with respect to the vertical transverse plane Z of the vehicle, so that excellent all-round vision is ensured from a point 57 corresponding to the average driver's sitting position in a left-hand drive vehicle. Similarly, straps 216 may be stretched across in front of the rear side windows. Obviously either a vertical or horizontal arrangement may be chosen for all straps. The alternative disposition is shown in FIG. 4 in application to the rear side window 20, where, differing from FIG. 5, the straps 216a are arranged with their longitudinal axes parallel with the wheel base plane Y, i.e. substantially horizontally.

The strap arrangements located above the back-rests correspond to those shown in FIGS. 2a, 2b. Here again it will be apparent how, by a slightly adjusted inclination of the transverse axes of the straps 316 or 316a, the rearward view for the driver remains unaffected. Of course, optimum conditions of vision for the driver and other occupants is attained when the straps are arranged approximately horizontally; see for example FIGS. 1a, 1b, 15.

Figures 8, 9:
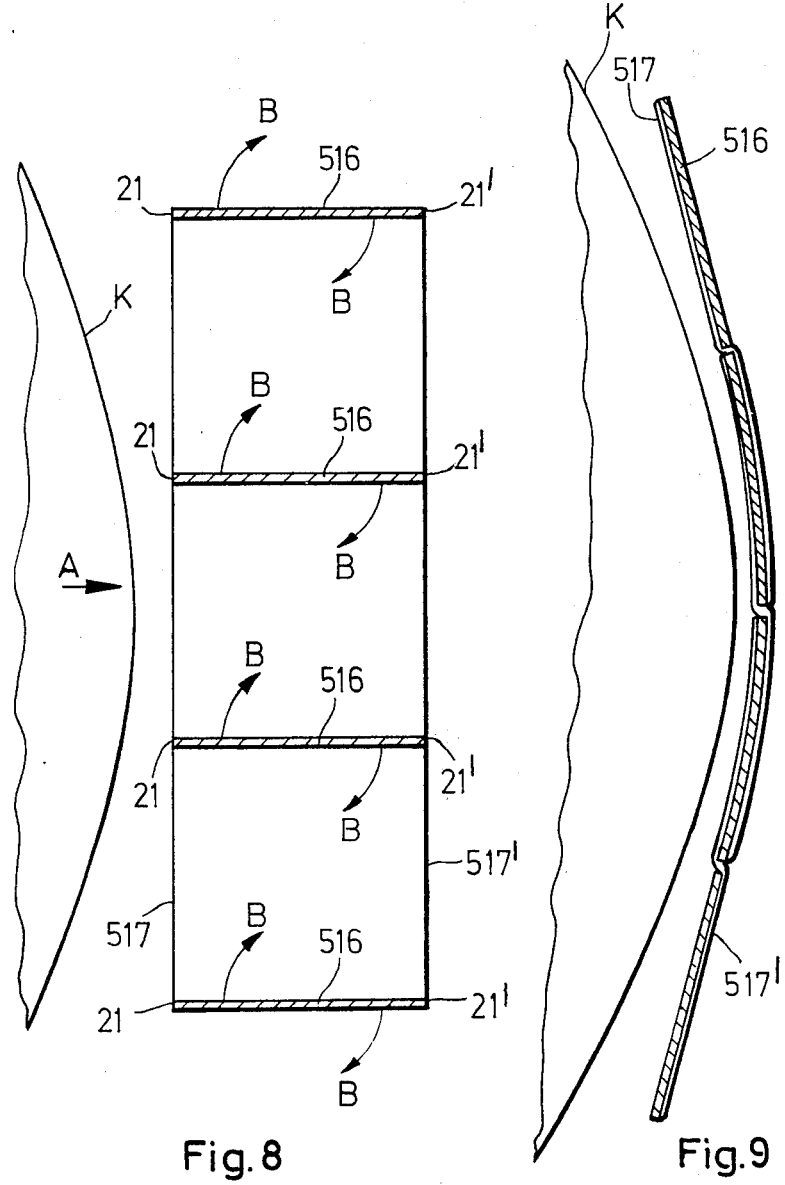
FIGS. 8, 9 are schematic presentations similar to FIGS. 6, 7 but with a different strap arrangement.

In order to illustrate the action of the strap arrangement in the event of acceleration or in the event of deceleration FIGS. 6 and 7 indicate the back of his head K. In normal riding conditions the straps 416 assume the edge-on position indicated in FIG. 6 and are connected together at their parallel intervals by the spacing threads 417 which pass through the straps in their longitudinal central axis. If the back of the head K of the vehicle occupant strikes in the direction of arrow A in FIG. 6 against the outer edges of the straps, then these latter pivot about the threads 417 in the direction of arrow B, (indicated in FIG. 6) until they have reached the position shown in FIG. 7. Here they present a closed interception surface adapted to its shape and they convert the motional energy into deformation work by the plastic elongation of the straps. The same process is schematically illustrated as regards the straps employed, in connection with a different embodiment shown in FIGS. 8 and 9. Here the straps 516 are kept parallel and distanced from each other (FIG. 8) by spacing threads 517, 517' which are secured to the longitudinal edges of the straps and opposite each other at 21 and 21' respectively. The swivelling of the straps about their longitudinal central axes in the direction of the arrows B, under loading by the head K in the direction of arrow A, takes place in the same manner as with the example according to FIGS. 6 and 7. The final position of the straps under full load is indicated in FIG. 9.

Figure 10:
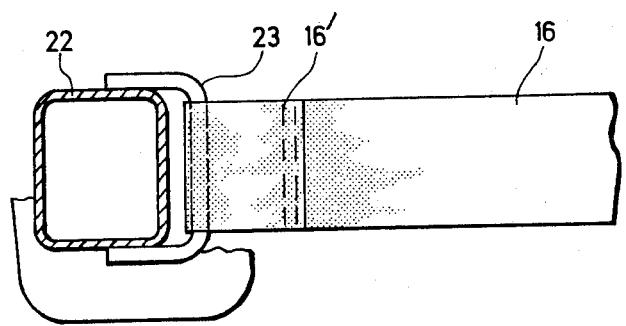

For the purpose of extending the straps across the width of the vehicle within the passenger compartment (see for example FIGS. 1b and 15), a rigid attachment of the strap ends to bodywork parts or frame parts is adequate. For instance each strap extremity — as FIG. 10 shows — may be attached to a yoke 23 secured to a frame part. However, in the case of shorter straps, e.g. when the strap arrangement is designed as a head restraint curtain (see FIG. 1a for instance) a rotatable mounting of the strap extremities is preferable in order to facilitate rotation of the straps about their longitudinal axes. A suitable embodiment of this is show in FIG. 11.

Figure 11:
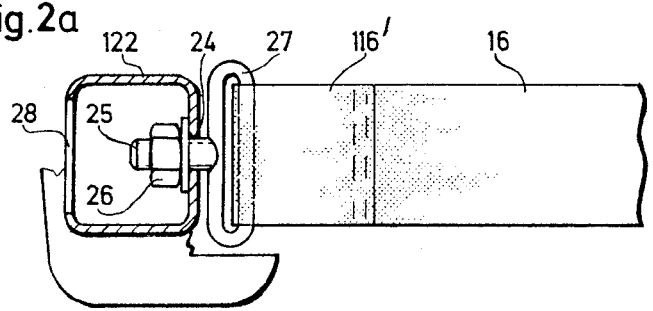
Figure 3:
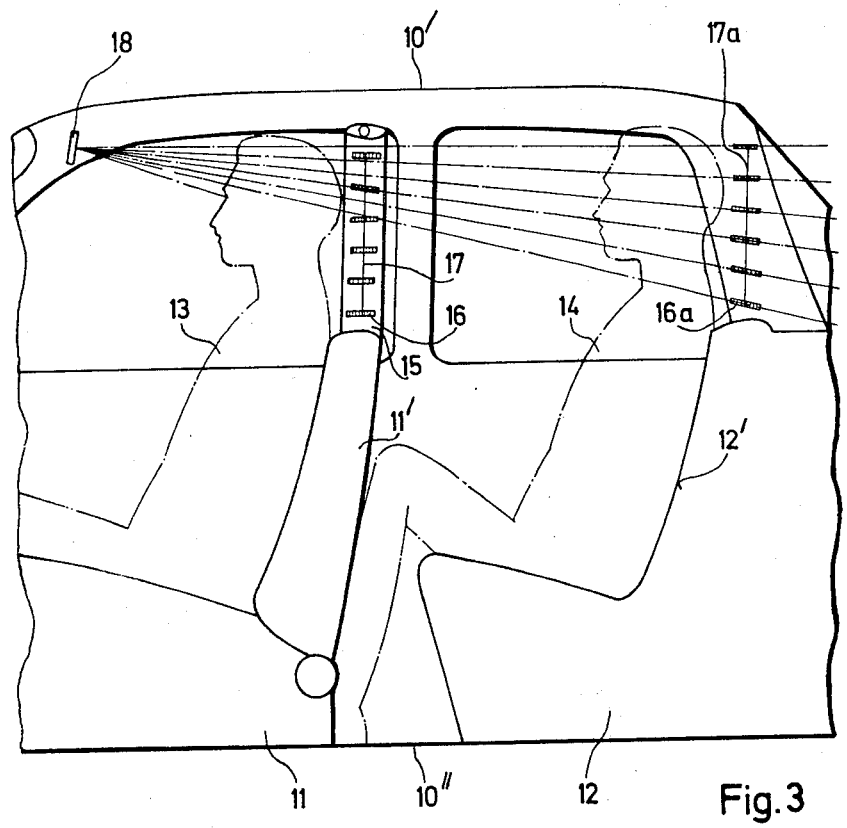
FIG. 3 is a schematic partial presentation of a passenger car in side elevation with a view of the passenger compartment and of strap arrangements as in FIGS. 1a and 1b.

In FIG. 11, the frame 122, which may either be a bodywork side-panel part (FIG. 1b) or a head restraint frame part (FIG. 1a), is provided with several holes 24 on its inside, at intervals running at right angles to the drawing. The intervals correspond to the spacing of the straps (which are generally designated by 16 or a reference numeral increased by a hundred, as the case may be) and therefore correspond to the parallel belt spacings. Bolts 25, introduced into the holes 24 and secured by nuts 26, are welded at one end on to an eyelet 27 which corresponds to the width of the strap and to which each strap extremity is secured by means of a loop 116'. A cavity in the frame 122 opposite each hole 24, serves for easy assembly.

Figure 12:
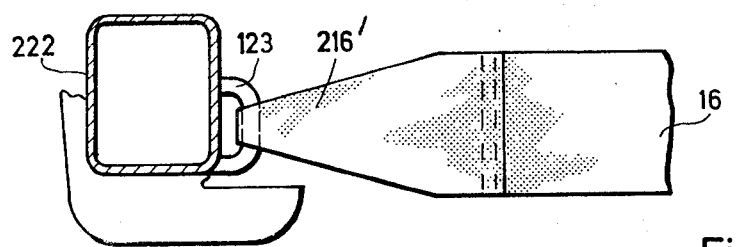
FIGS. 10, 11, 12, are schematic presentations of various mountings for the straps.

FIG. 12 shows a rigid strap-mounting similar to the example in FIG. 10. Smaller yokes 123, distributed according to the spacing of the straps, are welded on to each frame 222, and a strap extremity is secured in the yoke by a loop tapered in wedge shape. This tapering at the attachment point brings about easier pivoting of the strap about its longitudinal axis when the strap is loaded.

The twisting of the straps from their normal edge-on position into a closed area may also be brought about automatically by special mechanical means in dependence upon a certain limiting deceleration or acceleration value. In FIGS. 13 and 14 which show an example of this embodiment, the strap 616 similar to the example in FIG. 8, form an arrangement with mountings according to FIG. 11 and are held rotatable about their longitudinal axes LA, in lateral frames (not shown). The longitudinal edges of all straps are connected together by spacing threads 617, 617' which extend into the back-rest 112' of the rear compartment seat for example, as indicated. There, at both sides, in the vertical plane of the strap edges, the threads are each secured to a double-armed lever 29 which is pivotable about a fixed axis 30 and, under the action of a tension spring 31, rests with one arm against the movable core 32 of a solenoid 33. If an accident causes a sudden deceleration of the vehicle (frontal impact) or acceleration (rear impact) exceeding a predetermined limiting value, then the solenoid 33 can be supplied with current from the vehicle battery, through a sensor (not shown). The control of certain switching devices in motor vehicles by means of so-called sensors responding to vehicle deceleration or acceleration is generally known and therefore, since it does not belong to the subject of the present invention, need not be explained in further detail with regard to construction and mode of operation. As an example of such sensor arrangement in this connection, reference may be made to German specification No. 2 232 288. The impulse which causes the solenoid 33 to be supplied with current may therefore be derived from a pendulum per se known responding to deceleration or acceleration for example, or from a switch responding to mechanical contact and arranged on the vehicle bumper bar, like that known in connection with seat belt retracting devices. On energisation of the solenoid magnet, its core 32 is drawn in, and the released lever 29 is turned about its axis 30 by spring 31, (FIGS. 13 and 14) until it reaches the position indicated in FIG. 14. During this pivoting movement of the lever, the threads 617, 617' secured thereto swivel all the straps 616 into the position according to FIG. 14. The occupant's head thus contacts an intercepting curtain surface which is relatively soft and acts with an energy-converting effect due to the plastic elongation work of the straps.

It will be understood that, instead of a sensor-controlled solenoid in conjunction with a tension spring, the pivoting of the straps bands can also be brought about by an electric motor, for instance. This can be set into operation by a sensor and may be additionally controlled by the driver if he wishes to adjust the straps for the best conditions of vision during normal driving. Hence the strap arrangement can also be used as an anti-dazzle shield against sunshine; see also FIGS. 20, 21.

Figure 15:
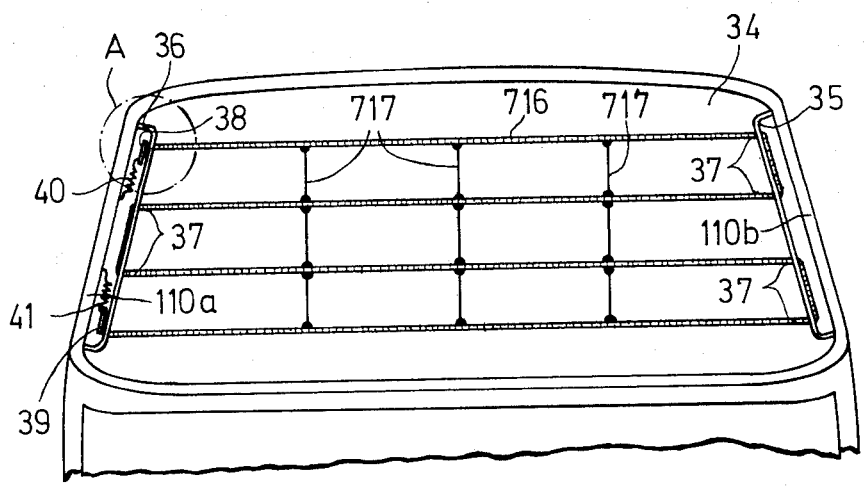
FIG. 15, is a schematic presentation of a further embodiment with reference to a strap arrangement situated above the back-rest of the rear compartment seats, and seen in the direction of travel.
Figure 17:
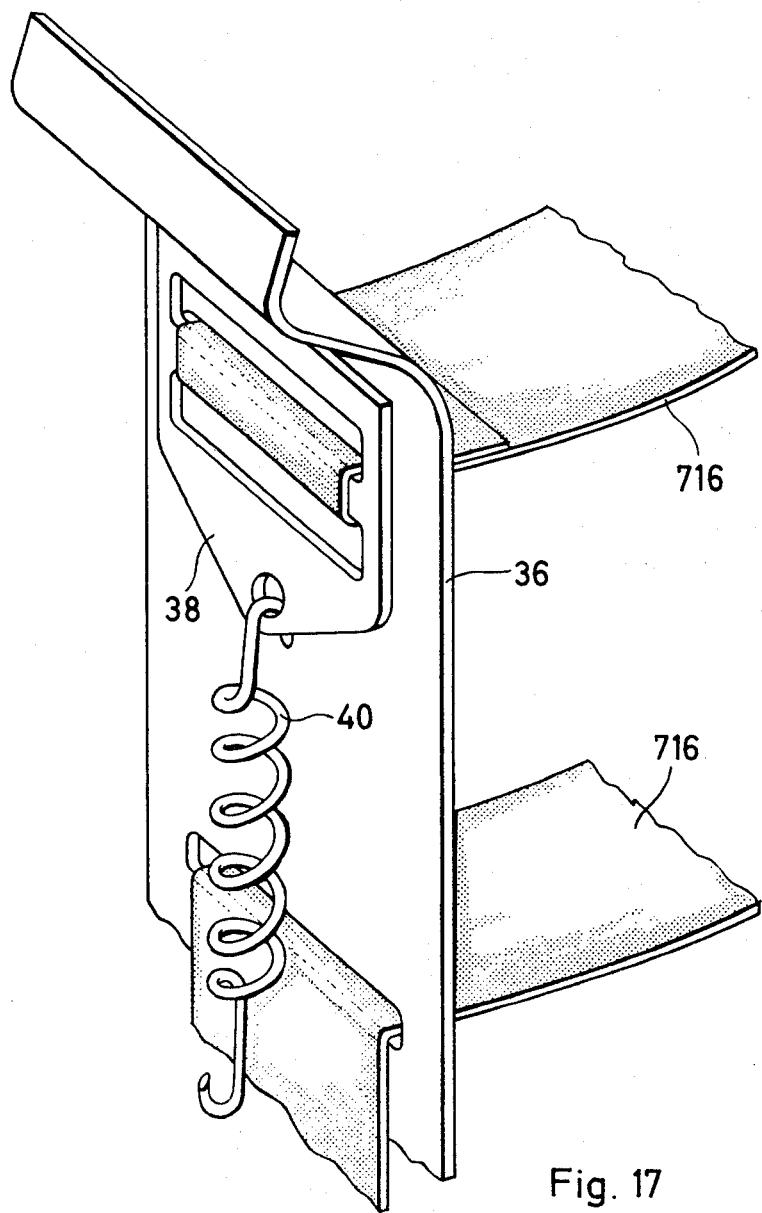
FIG. 17, is an arrangement in accordance with FIG. 16 in a strap position in which the straps are loaded (swivelled position)

A further embodiment of a belt arrangement according to the invention employs a one-piece strap 716 and is illustrated in FIGS. 15 and 17.

Here, FIG. 15 shows the strap arrangement above the rear compartment back-rest in the region of the rear window 34 of a motor vehicle. The one-piece length of strap material is mounted, deflecting itself at 37, in yokes 35, 36 secured to both bodywork side panels 110a, 110b, and again its horizontal parts are held distanced from each other by spacing threads 717 tied in at the longitudinal axis of the straps. The two ends of the strap length are attached to a pillar of the bodywork side-wall by a shackle 38, 39 and tension spring 40 and 41 respectively. The springs prevent "sagging" of the straps and also compensate for tolerances. It is also possible to connect the two shackles together with only one spring element. In an enlarged perspective presentation (FIG. 16) of the cut-away A from FIG. 15, it is illustrated how the strap 716 with its shackle 38 is passed through a slit 36' in the yoke 36 and is attachable to the side-wall of the vehicle body by means of the tension spring 40 in the manner apparent from FIG. 15. If, in the event of an accident, the occupant's head is pressed against the strap 716, then the strap loading causes the shackle 38 to be pulled against spring 40 into the position illustrated in FIG. 17 in which the shackle forms an abutment against further withdrawal. A withdrawal to the amount G in FIG. 16, has no detrimental influence on the support of the occupant's head, since the withdrawal serves merely for compensating the length or the tolerances and can therefore be made relatively small.

Figure 16:
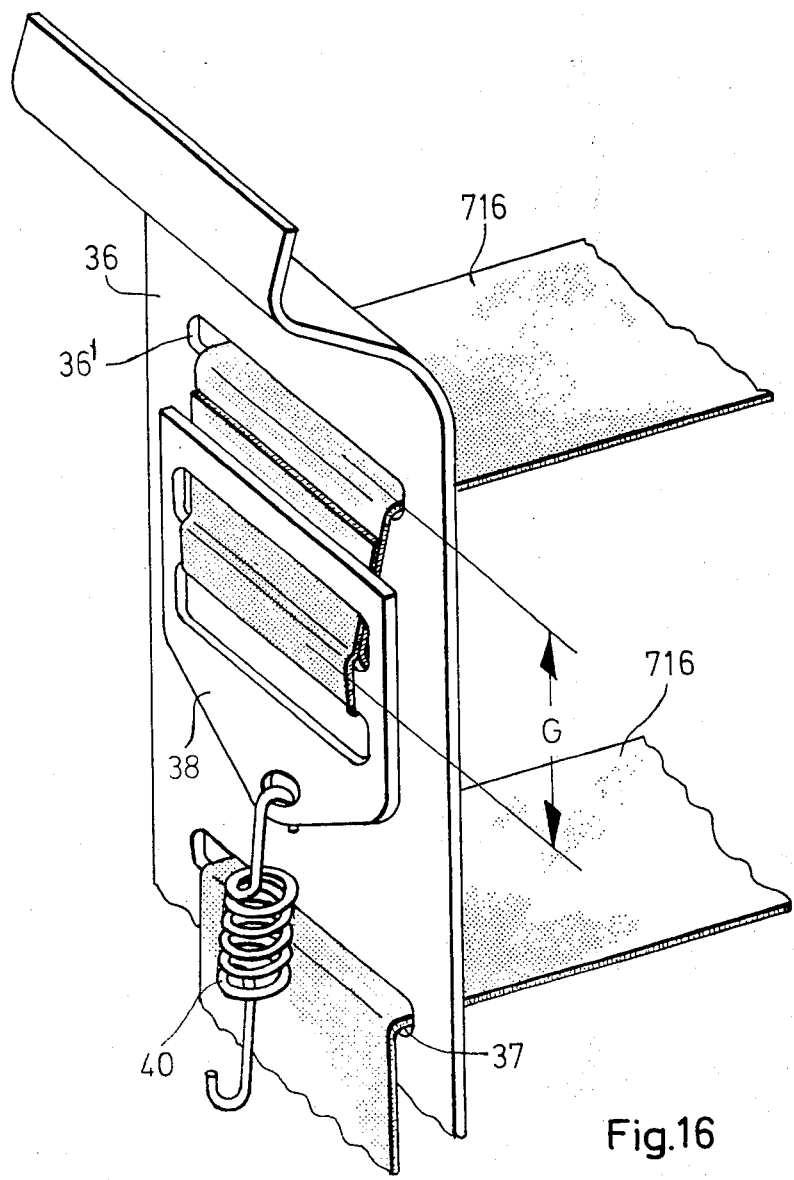
FIG. 16, is a perspective fragmentary presentation of a strap attachment according to a cut-away A in FIG. 15 but to an enlarged scale.

As regards the belt arrangement shown in FIGS. 15 to 17, in the main, two possibilities of installing it present themselves:

1. The yokes 35, 36 are connected to the bodywork side-walls, for example by welding, before introducing the strap length. Then a strap end with shackle 38 for example is pushed through the upper slit 36' and the shackle is locked by tilting. The other belt end with shackle 39 is then passed through the further slits of the yoke in serpentine fashion in such a way as to produce the arrangement according to FIG. 15. By attaching the springs 40, 41, the strap length 716 is tensioned. Then the spacing threads can be drawn through the longitudinal axis of the belt band, and tied in (see FIG. 19).

2. The yokes 35, 36 with the already threaded-in strap 716, are screwed on to the bodywork side-wall for instance. In this case, before the yoke is screwed on, the strap length is drawn through the corresponding slits of the yokes 35, 36, as described in paragraph 1. above, the spacing threads 717 having already been previously tied to the straps running approximately horizontally. Then the springs 40, 41 are hooked on to the shackled 38, 39 of the belt ends and are secured to the yoke 36, and not to the side-wall of the vehicle body as illustrated in FIG. 15.

Figure 18:
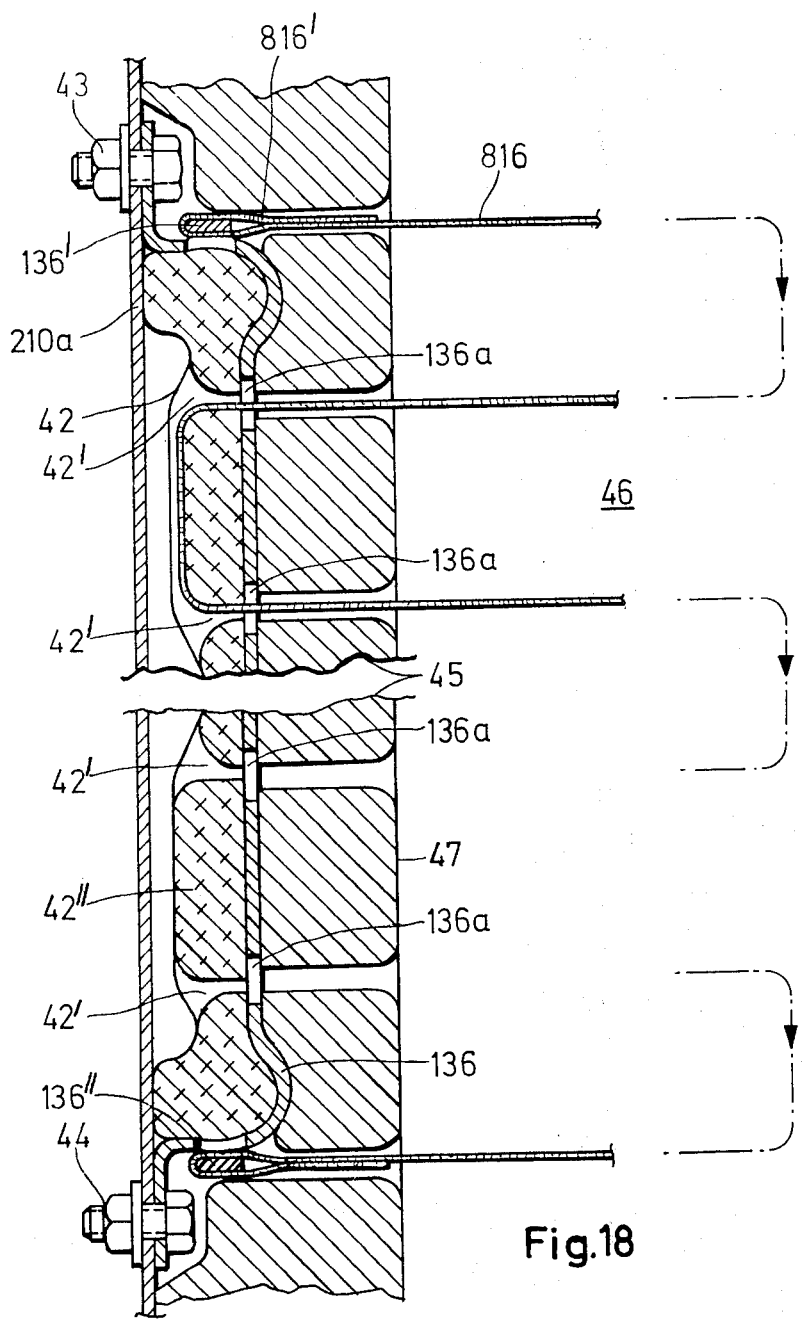
FIG. 18, is a further construction of a strap mounting similar to the arrangements in FIGS. 15, 16 17 in a schematic fragmentary presentation in a cross-section through the vehicle, not shown in detail.

An embodiment similar to that illustrated in FIGS. 15 to 17, but replacing its metal springs (40, 41) by resilient cushions 42 for a strap length 816 mounted with an initial tension, is schematically illustrated in FIG. 18. It may however be placed inside a head restraint. Reference numeral 136 designates a yoke such as may be screwed on to each side-wall of the bodywork 210a or 210b (not shown) at either side of the vehicle. In the interest of better elucidation of the geometric allocation of the belt arrangement, reference is made here quite generally to the side-wall of the bodywork, but quite specifically this may be a central or rear door pillar to which the strap length is mounted for instance, or it may be a lateral frame part of a head restraint when a resilient cushion is to be employed in a head restraint for example. The strap length 816 is secured at one end by a loop 816' to an outwardly bent lug 136' on the yoke 136 and is mounted in a similar manner at 136''. Between its two extremities, the belt follows a serpentine course, (dash-dot course indicated by arrows) in the same way as described under FIGS. 15 to 17.

The resilient cushions 42 are provided with cavities 42' and the yoke with corresponding cavities 136a, through which the strap length is passed. The cavities 136a are made somewhat larger, in order to allow a greater twisting capability to the strap length. Below the separating lines 45 in FIG. 18, the cushion 42'' is shown without a strap, i.e. in the released state. Towards the interior 46 of the vehicle, the side-wall 210a together with the yoke 136, is covered by a padding.

Figure 19:
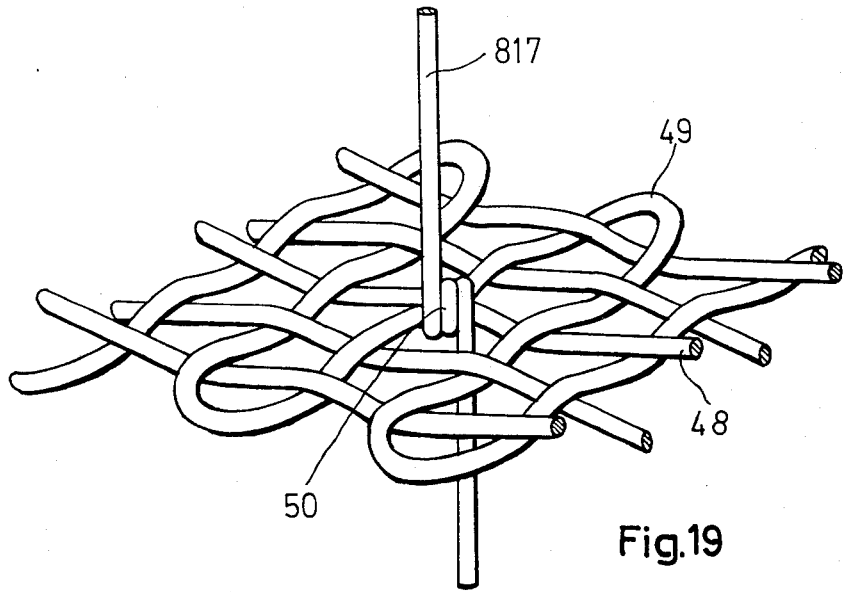
FIG. 19, is a highly enlarged and schematically presented weave pattern representing a cut-away from a strap.

FIG. 19 schematically illustrates a correction of the spacing thread 817 with the strap fabric consisting of warp threads 48 and woof threads 49. Here, the spacing thread is looped twice around the intersecting warp and woof threads at 50. It is alternatively possible to loop the spacing threads once or several times round warp and woof and/or to tie them, by a knot. Again, for example, several warp threads and/or woof threads may be connected to the spacing threads in each case.

Figure 20:
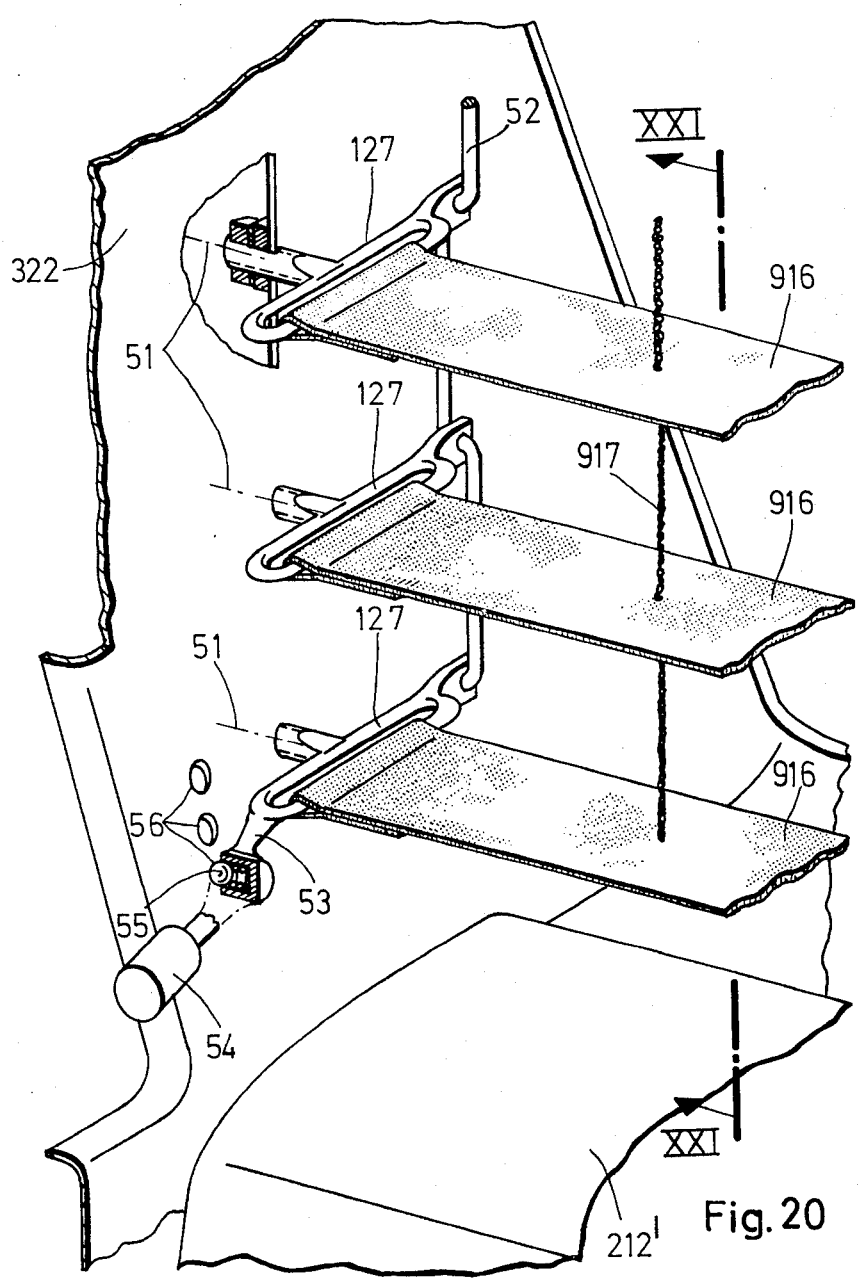
FIg. 20, is a further embodiment of the invention concerning a strap arrangement capable of use as a sun blind, in a schematic fragmentary and perspective presentation.
Figure 21:
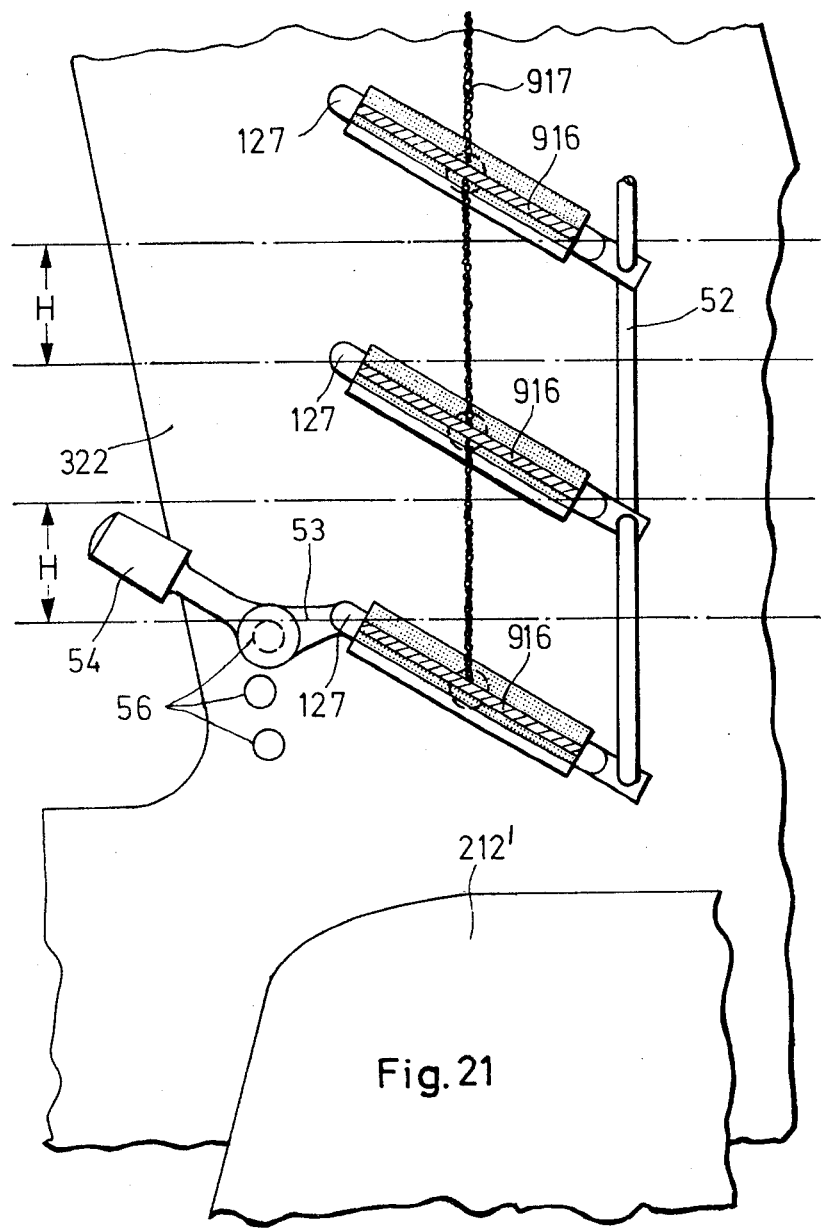
FIG. 21, is a schematic presentation of the strap arrangement in section along line XXI — XXI in FIG. 20, with the strap in the swivelled position.

A strap arrangement for protecting the heads of vehicle occupants and additionally capable of use as a sun-blind, with the straps manually adjustable to correspond with the incidence of the sun's rays, is shown in FIGS. 20 and 21. Here, the straps 916, distanced parallel with each other by spacing threads 917, are secured rotatably about the pivot 51 in a pillar 322 (shown partially only) in each of the two side-walls, corresponding with the mode of attachment shown in FIG. 11. The strap eyelets 217 are fixed in their position relative to each other by a linkage 52. The bottom eyelet carries a hand lever 53 with handle 54 and may be secured in different (here three) swivelling positions by a catch device consisting of a spring-loaded ball 55 and corresponding drop-in bores 56 in the pillar 322. FIG. 20 shows a strap position in the lower setting, i.e. a position in which the loading surfaces formed by the flat faces of the straps runs approximately parallel with the wheel-base plane of the vehicle, FIG. 21 shows an arrangement set to the upper setting where the straps are inclined so as to shield against the sunlight. At the same time the upper position is so arranged that approximately half (amount H) of the rear pane area, which is clearly visible from the occupants, with the setting in the lower position, can still be seen through. Reference numeral 212' designates the upper end of the seat back-rest.

Of course, during parking of the vehicle for instance, it is possible to turn the straps through an angle of about 90°, commencing from the position according to FIG. 20, so as to prevent sun irradiation from the rear. With this object, remote control of the hand lever 53 from the driver's seat also, possibly by means of a Bowden cable, may be expedient.

Finally, it should be pointed out that, particularly when the straps are in a close arrangement (overlapping of the swivelled straps in the event of accident) or in the case of relatively short belt bands, it is possible to dispense with the spacing threads 17 to 917.

Practical tests of the invention in so-called 'Crash-Tests' on a proving track, yielded results which were truly satisfactory. Thus for example in a rear impact, with the colliding vehicle travelling at about 50 km/hr. (31 m.p.h) and using a test dummy, a resulting head acceleration of 45 g. was measured. This value lies considerably below that laid down in certain basic guidelines for such tests at the moment. These provide for a value of 80 g for this case, but of course with a collision speed of only 40 kg/hr. (25 m.p.h).

We claim:

1. In a vehicle body, an occupant head restraint comprising:
    a plurality of flat flexible straps having elongated configurations with predetermined widths, each of the straps having opposite ends formed into loops; and
    attachment members mounted on the vehicle body and associated with the opposite ends of the straps, the attachment members having portions received within the loops of the straps to position the straps in a spaced relationship extending parallel to each other adjacent the head of a seated occupant of the vehicle body, and the attachment portions normally maintaining the planes of the straps in alignment with the line of sight of the occupant so as not to impair the occupant's vision and permitting the straps to rotate into a common plane as the occupant's head engages the straps so that this engagement is with the total width of the straps in an effective restraining manner.

2. The head restraint of claim 1 wherein the ends of the straps have tapered configurations where their ends are formed into loops, and wherein the portions of the attachment members received within the loops are fixed on the vehicle body so the tapered strap end configuration permits the strap rotation upon engagement by the occupant's head.

3. The head restraint of claim 1 wherein the portions of the attachment members received within the loops of the straps are pivotally mounted relative to the vehicle body to permit the rotation of the straps upon engagement of the occupant's head with the straps.

* * * * *